(No Model.)
W. W. GREEN.
HARROW.
No. 478,259. Patented July 5, 1892.
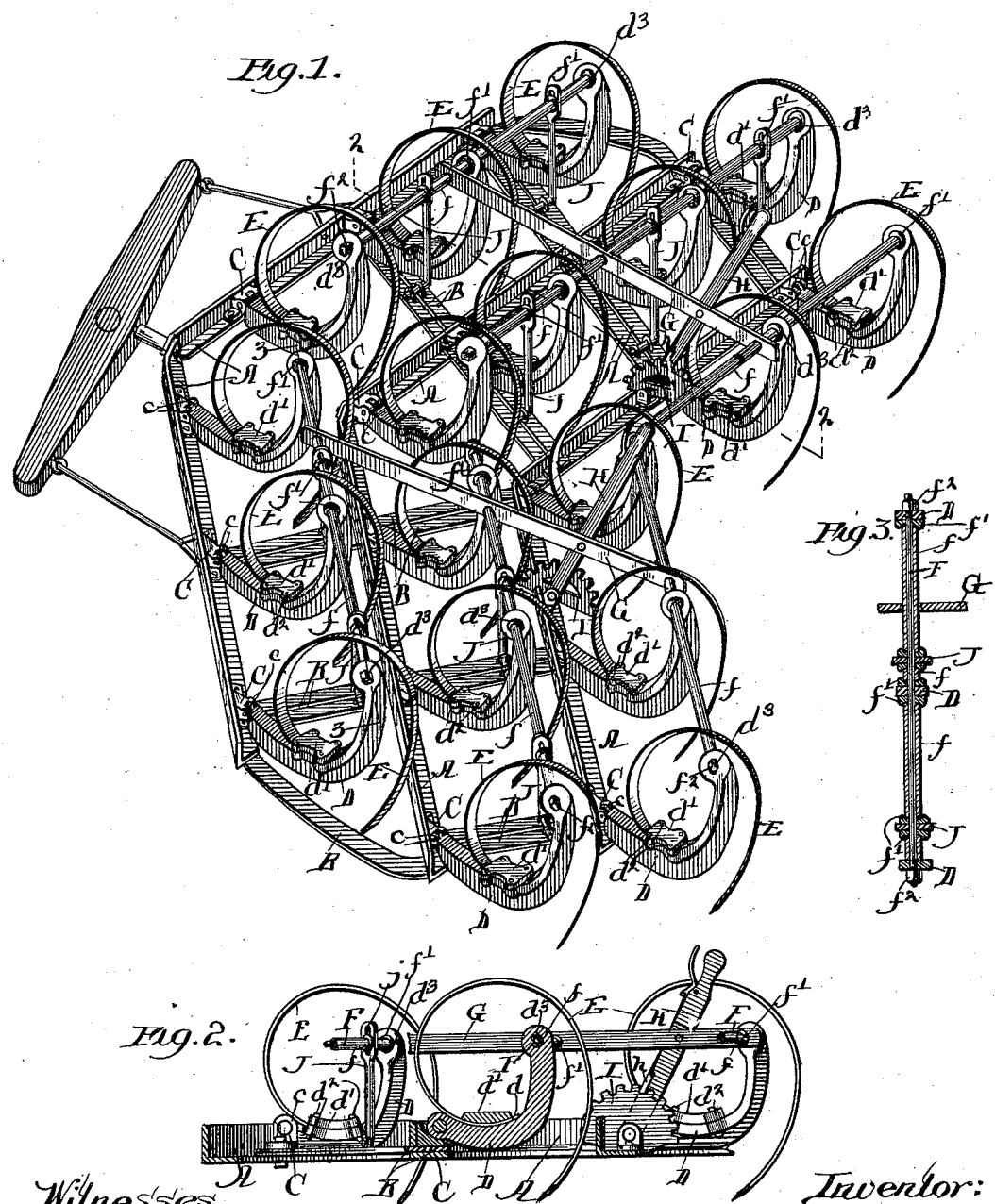
Witnesses.
Chas. O. Thorey.
O. P. Smith.
Inventor:
William W. Green
By Wiles, Green & Bitner
Attorneys.

UNITED STATES PATENT OFFICE.

WILLIAM W. GREEN, OF CHICAGO, ILLINOIS, ASSIGNOR OF ONE-HALF TO ALICE V. TERRY, OF BROCKPORT, NEW YORK.

HARROW.

SPECIFICATION forming part of Letters Patent No. 478,259, dated July 5, 1892.

Application filed April 18, 1891. Serial No. 389,427. (No model.)

*To all whom it may concern:*

Be it known that I, WILLIAM W. GREEN, a citizen of the United States of America, residing at Chicago, in the county of Cook and State of Illinois, have invented certain new and useful Improvements in Harrows, of which the following is a specification.

There is a class of harrows in common use which have come to be known by the name of "spring-tooth harrows." They have been very successful and have come into quite extensive use. In these harrows the teeth are made of a flat strip of spring metal bent in the form of a short helix and clamped to the frame by means of U-shaped clamps having nuts threaded to them and cross-plates or double washers, by means of which the frame and the teeth are firmly secured together. This construction has been found faulty for the reason that to make any adjustment of the teeth it is necessary to loosen two nuts for each tooth, which is an exceedingly laborious job and takes considerable time. Then, too, to adjust all the teeth alike it is necessary that the harrow should rest upon a perfectly-level surface, which is not ordinarily found in a field where the harrow is at work. For this reason the latter must be carried to a barn-floor or similar surface in making the adjustment of the teeth.

It is the purpose of my invention to provide simpler means for varying the adjustment of the teeth; and to such end said invention consists, primarily, in providing each of the teeth with a device by means of which it may be readily adjusted and then preferably connecting a number of these devices together, so that they may all be operated at once, in order that time may be saved in making the adjustment and also that all of the teeth may be adjusted so as to be exactly alike. Various means might be used to accomplish this purpose, all of which would come under the general scope of my invention. The devices described below comprise, however, my preferred construction and make up what I believe at present to be the simplest, lightest, cheapest, and most durable harrow containing the desired features. This construction is illustrated by means of three figures in the drawings, of which—

Figure 1 is a perspective of a complete harrow; Fig. 2, a section in line 2 2 of Fig. 1, and Fig. 3 a section in line 3 3 of Fig. 1.

In this harrow the frame is shown as constructed of short pieces of angle-iron A, extending both ways from the center, where the two portions of the harrow are hinged together, and cross-bars, preferably of flat metal B, bolted or riveted to the angle-iron. The bars are placed upon the upper surface of the horizontal flange of the angle-iron, and the vertical flange is slotted to receive them. To furnish a support for the teeth which shall enable them to be easily adjusted, blocks C are secured to the angle-iron at the proper places, having ears $c$, between which swinging arms D are pivoted, having upon their upper surfaces sockets $d$, fitted to the teeth E, which are tightly clamped therein by means of plates $d'$, bolted to the arms by means of bolts $d^2$. The arms themselves extend backward within the teeth and, curving upward, are bored at $d^3$ to receive cross-rods F, uniting the arms, which are in line with each other, the rods being themselves united by means of bars G, pivotally secured to them and movable back and forth by means of a hand-lever H, held in any desired position by a segment I and spring-catch $h$ upon the lever. It will be readily seen that by moving the hand-lever back and forth the teeth will be either raised or lowered, as desired, and will be held in position by means of the segment. In light work this may be found to afford sufficient strength; but for heavy work I prefer to employ additional means for holding the teeth in place and stiffening up the whole construction. For this purpose I have placed upon the braces B standards J, hinged thereto, having in their free ends slots $j$, adapted to receive the rods F, controlling the teeth, and to allow said rods a slight movement back and forth. Then I also provide upon the rods F sleeves $f$, preferably composed of metal tubes and bearing upon the standards J, arms D, and bars G by means of cup-shaped washers $f'$, interposed between the ends of the tubes or collars and these different pieces. On the ends of the rods I thread nuts $f^2$, by means of which all of the tubes and washers may be tightly clamped upon the parts against which they bear. This affords a rigid support for each tooth adjacent to such tooth and still leaves the teeth easily adjustable by loosening the nuts at the ends of the rods.

The standards J are hinged to the frame so that they may swing back and forth and allow the teeth to be raised completely out of the ground. As the rods F pass through both the swinging arms D and the standards J, it is obvious that they could not be moved back and forth unless either the standards or the arms had slots to receive them, inasmuch as the pivots of the standards and those of the arms are not in line. It is due to this fact that when the rods are tightened up, as before described, and prevented from moving in the slots the teeth are held rigidly to their work unless subjected to a breaking strain, when the rods will yield and relieve the teeth.

I claim as new and desire to secure by Letters Patent—

1. The combination, with the frame of a harrow, of the blocks C, arms D, teeth E, rods F, bars G, handle H, and segment I, substantially as described.

2. The combination, with the frame of a harrow, of blocks C, arms D, standards J, and rods F, having sleeves $f$ and nuts $f^2$, by means of which the rods, the standards, and the arms may be tightly clamped together, substantially as described.

3. The combination, with the frame of a harrow containing the angle-iron pieces A, of blocks C, fitted into the angle of said iron and having ears $c$, swinging arms D, pivoted to said blocks, teeth E, mounted upon said arms, connecting devices adapted to unite two or more of such teeth, and adjustable supports for the connecting devices, substantially as described.

4. The combination, with the frame of a harrow, of swinging arms D, pivoted thereto, spring-teeth E, secured to the arms, standards J, secured to the frame, rods F, passing through holes in the arms and slots in the standards, encircling tubes $f$, spacing the arms and standards apart, and nuts $f^2$, threaded to the ends of the rods, by means of which the tubes, arms, and standards may all be tightly clamped together, substantially as described.

5. The combination of a suitable frame, a series of arms D, pivoted thereto, a series of teeth E, mounted upon the arms, a series of standards J, mounted upon the frame, connecting rods F, passing through holes in the arms and slots in the standards, encircling tubes $f$ and cup-shaped washers $f'$ between the standards and the arms, and nuts $f^2$, threaded to the ends of the rods and adapted to clamp the arms, standards, tubes, and washers tightly together, substantially as described.

WILLIAM W. GREEN.

Witnesses:
H. BITNER,
C. P. SMITH.